(12) United States Patent
Sakamoto et al.

(10) Patent No.: US 6,722,230 B2
(45) Date of Patent: *Apr. 20, 2004

(54) POWER TRANSMISSION APPARATUS OF MOTOR VEHICLES

(75) Inventors: Hiroshi Sakamoto, Hitachi (JP); Toshimichi Minowa, Mito (JP); Mitsuo Kayano, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/773,924

(22) Filed: Feb. 2, 2001

(65) Prior Publication Data

US 2001/0042647 A1 Nov. 22, 2001

(30) Foreign Application Priority Data

Feb. 4, 2000 (JP) .......................................... 2000-032799

(51) Int. Cl.[7] .............................. F16H 37/06; B60K 1/02
(52) U.S. Cl. ............................................. 74/661; 477/3
(58) Field of Search ............................ 180/65.2; 74/661; 477/3; 475/5

(56) References Cited

U.S. PATENT DOCUMENTS

| | | | | |
|---|---|---|---|---|
| 5,558,589 A | * | 9/1996 | Schmidt | 475/5 |
| 5,943,918 A | * | 8/1999 | Reed, Jr. et al. | 74/661 |
| 6,019,698 A | * | 2/2000 | Lawric et al. | 477/5 |
| 6,142,907 A | * | 11/2000 | Minowa et al. | 477/5 |
| 6,258,006 B1 | * | 7/2001 | Hanyu et al. | 477/5 |
| 6,328,670 B1 | * | 12/2001 | Minowa et al. | 477/5 |
| 6,341,541 B1 | * | 1/2002 | Sakamoto et al. | 74/665 A |
| 6,428,438 B1 | * | 8/2002 | Bowen | 475/5 |
| 6,510,911 B1 | * | 1/2003 | Satou et al. | 180/65.2 |
| 6,592,484 B1 | * | 7/2003 | Tsai et al. | 475/5 |

FOREIGN PATENT DOCUMENTS

| | | |
|---|---|---|
| DE | 19528628 | 2/1997 |
| FR | 2699127 | 6/1994 |
| FR | 2777231 | 10/1999 |
| JP | 10-217779 | 8/1998 |

OTHER PUBLICATIONS

International Search Report.

* cited by examiner

*Primary Examiner*—Dirk Wright
(74) *Attorney, Agent, or Firm*—Crowell & Moring LLP

(57) ABSTRACT

Disclosed is a power transmission apparatus of motor vehicles which has an engine and an electric rotary machine. The power transmission apparatus has an engine, a gear change apparatus, an electric rotary machine to which a power is transmitted via the gear change apparatus, and a clutch provided between an input shaft and an output shaft of the gear change apparatus and adjusting a transmission torque between the input shaft and the output shaft, whereby a speed change shock can be mechanically reduced.

12 Claims, 12 Drawing Sheets

POWER TRANSMISSION APPARATUS OF MOTOR VEHICLES

BACKGROUND OF THE INVENTION

The present invention relates to a structure of a power train system comprising an engine, an electric rotary machine (hereinafter, one primarily used for driving is called as an electric motor, one primarily used for generating power and starting an engine is called as a power generator and one used for driving and generating power with generally the same frequency to each other is called as a motor generator) and a gear change mechanism, and more particularly to a power transmission apparatus for improving a transmission efficiency of a power train system.

In view of a problem of global environment, it becomes important to establish a hybrid control system for motor vehicles, in which a great reduction of specific fuel consumption can be expected.

In JP-A-10-217779, there is disclosed an integrated hybrid power transmission apparatus constituted by a single electric rotary machine, a speed change gear mechanism and a clutch mechanism. The apparatus disclosed in the publication is so constituted that the gear change mechanism having the electric rotary machine and the clutch mechanism is integrally contained in a housing of the power transmission apparatus to make the power train system compact and light in weight. Further, by always connecting an input shaft of the gear change mechanism with the electric rotary machine, it is possible to take a driving manner so-called "a series hybrid system" in which an engine drives only the electric rotary machine to generate a power by a part of which other electric rotary machines are driven to run a vehicle. The engine and the electric rotary machine are totally controlled so as to satisfy a feeling of speed acceleration and deceleration desired by a driver and operate the engine and the electric rotary machine in a high efficiency zone.

The system shown in JP-A-10-217779 has the following problems.

First, in order to reduce a torque shock during changing a gear change ratio, for example, from a first speed to a second speed or from a second speed to a third speed, it is necessary to arrange the electric rotary machine in a drive wheel side to the gear change mechanism. On the contrary, in order to generate power by the engine drive force in the series hybrid manner, it is necessary to arrange the electric rotary machine In the engine side to the gear change mechanism. Accordingly, in order to prevent the gear change shock and also improve the gear change performance, at least two or more electric rotary machines are required, resulting in a problem that the drive system becomes a large size.

Second, since a torque transfer mechanism of the engine output shaft to an electric rotary machine output shaft is complex, an efficiency of torque transmission is low.

Third, since the drive system is so constituted that the electric rotary machine is driven by the engine, an inertia torque of the rotor of the electric rotary machine is exerted on the engine side as a load. Thus, during running under the engine drive, in order to correctly execute an acceleration command from the driver, it is necessary to generate an additional torque for canceling the inertia torque in the engine side as well as the torque corresponding to the acceleration command. This poses a problem that the specific fuel consumption is deteriorated in order to improve a driving performance.

BRIEF SUMMARY OF THE INVENTION

Accordingly, an object of the present invention is to improve a transmission efficiency, reduce a specific fuel consumption of a vehicle and make a drive system compact, in a power transmission apparatus constituted by a gear change mechanism having an electric rotary machine and a clutch mechanism.

Under the object, there is provided an improved mechanism of a gear change apparatus according to the invention.

With respect to the first problem, it is effective to dispose a mechanism of mechanically reducing a gear change shock in place of employing an electric drive force such as an electric rotary machine for reducing the gear change shock. Accordingly, the invention is of a power transmission apparatus of motor vehicles, which has an engine, a gear change apparatus arranged between the engine and a vehicle drive shaft, an electric rotary machine connected to an output shaft of the engine and the vehicle drive shaft via the gear change apparatus, and a clutch arranged between an input shaft and an output shaft of the gear change apparatus and regulating a transmission torque between the input and output shafts. According to the clutch, it is possible to reduce the gear change shock generated during the gear change operation without arranging the electric rotary machine in the drive wheel side of the gear change apparatus.

Preferably, the power transmission apparatus of motor vehicles comprises the clutch mounted on a gear of a minimum gear change ratio in the gear change apparatus. By mounting the clutch on the gear of the minimum gear change ratio (i.e. the high speed side gear), it is possible to meet any change of rotation speed before and after the gear change operation.

Further, more preferably, the power transmission apparatus of motor vehicles is structured such that the clutch is provided in a gear having a speed change ratio equal to or more than 1 in the gear change apparatus. By providing the clutch in the gear having the speed change ratio equal to or more than 1, for example, the third speed change ratio in the gear change apparatus having the speed change ratios from the first speed change ratio to the fifth speed change ratio, it is possible to start by the clutch in the case that the clutch for starting is in trouble.

With respect to the second problem, the following technique will be possible. That is, in the hybrid vehicle, in order to improve the specific fuel consumption of the engine, there may be a case of stopping the engine when stopping the vehicle and using the electric rotary machine for starting the engine at every time of starting the vehicle. In this case, in view of an electric efficiency, it is effective to reduce and transmit the rotation of the electric rotary machine to the engine shaft via the gear change apparatus in place of directly transmitting the rotation to the engine shaft. Thus, according the invention, there is provided a power transmission apparatus of motor vehicles having an engine, a gear change apparatus arranged between the engine and a vehicle drive shaft, and an electric rotary machine connected to an output shaft of the engine and the vehicle drive shaft via the gear change apparatus, wherein a rotation of an output shaft of the electric rotary machine is reduced and transmitted to an engine side input shaft of the gear change apparatus.

Further, in the case of driving the electric rotary machine by an engine power to generate electric power, it is effective to restrict the number of transmission mechanisms for transmitting the engine power to the electric rotary machine (e.g. the number of gears) to be small. Thus, according to the invention, there is provided a power transmission apparatus of motor vehicles having an engine, a gear change apparatus arranged between the engine and a vehicle drive shaft, and an electric rotary machine connected to an output shaft of the engine and the vehicle drive shaft via the gear change apparatus, wherein the output shafts of the engine and the electric rotary machine are provided separately, and gears respectively mounted on the both shafts for transmitting the power of the both shafts directly engage with one another. By the direct engagement of the gears without interposing another gear therebetween, it is possible to restrain a reduction of the efficiency of power transmission.

More preferably, the present invention relates a power transmission apparatus of motor vehicles further having a clutch for breaking the connection between the output shaft of the electric rotary machine and the input shaft of the gear change apparatus at the electric rotary machine side. According to the clutch, it is possible to optionally break the connection of the engine and the electric rotary machine and prevent the inertia torque of the electric rotary machine from being exerted on the engine side as a load, thereby the third problem mentioned above can be solved.

A description will be in detail given below of an embodiment according to the invention referring to the accompanying drawings.

DETAILED DESCRIPTION OF THE PREFERRED EMBODIMENTS OF THE PRESENT INVENTION

Figure 1:
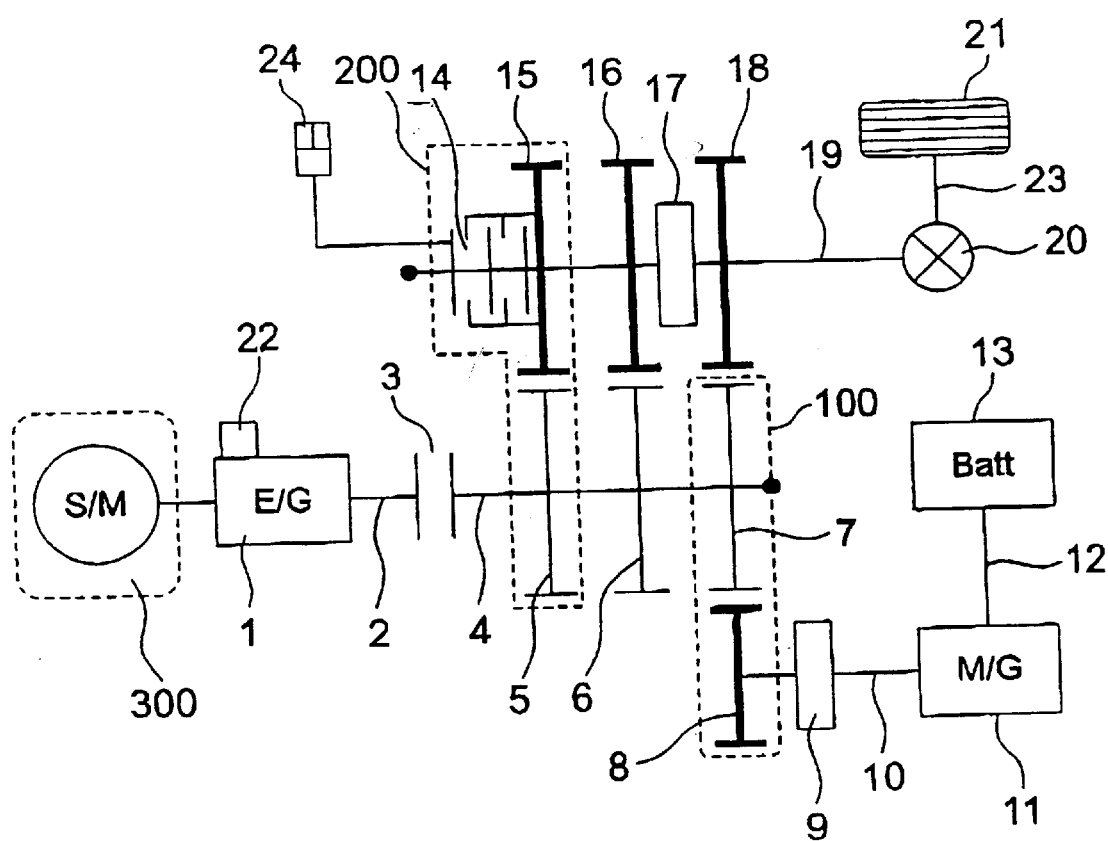
FIG. 1 is a schematic view of a drive system of motor vehicles according to a first embodiment of the invention.

FIG. 1 is a schematic view showing a whole drive system of motor vehicles according to a first embodiment of the invention. Reference numeral 1 denotes an engine and 11 a motor generator which outputs a kinetic energy by an electric energy provided from a battery 13 and which converts an applied kinetic energy into an electric energy to store into the battery 13. Reference numerals 21 denote a wheel and 23 a wheel axle.

Reference numeral 5 denotes a gear generally called as a high speed drive gear, and 15 a gear generally called as a high speed driven gear which engages with the high speed drive gear 5. The high speed drive gear 5 is fixed on a transmission input shaft 4.

Reference numeral 6 denotes a gear generally called as a low speed drive gear, and 16 a gear generally called as a low speed driven gear which engages with the low speed drive gear 6. The low speed drive gear 6 is fixed on the transmission input shaft 4.

Reference numeral 7 denotes a gear generally called as a middle speed drive gear which is fixed on the transmission input shaft 5. Reference numerals 18 denote a gear generally called as a middle speed driven gear, and 8 a motor generator driven gear. The middle speed driven gear 18 and the motor generator driven gear 8 engage with the middle speed drive gear 7, respectively. The relationship between the middle speed drive gear 7 and the motor generator driven gear 8 is set so as to have a gear ratio of transmitting a torque from the motor generator output shaft 10 to the transmission input shaft 4 with a reduced speed.

Reference numeral 9 denotes a motor generator dog clutch which has a function of engaging or disengaging the motor generator output shaft 10 with or from the motor generator driven gear 8. Reference numerals 17 denote a gear change dog clutch. The gear change dog clutch 17 has a function of engaging or disengaging the transmission output shaft 19 with or from the low speed driven gear 16 or the middle speed driven gear 18.

In general, it has been known that the dog clutch is free from slip loss when engaged and has a high transmission efficiency. Further, a dotted line 100 in the drawing denotes a torque transmission mechanism between the transmission input shaft 4 and the motor output shaft 10.

Reference numeral 3 denotes a start clutch. It may be a so-called dry type in which a clutch disc mounted to the transmission input shaft 4 is pinched between a flywheel and a pressure plate to transmit a torque, and which may have a mechanism for performing an "ON/OFF" operation is of such a type that an operation force of a clutch pedal (not shown) is transmitted by a hydraulic actuator or the like. The start clutch 3 may be also those conventionally known, such as a wet type multi-plate clutch, an electromagnetic clutch and so on.

Reference numerals 14 denote a high speed multi-plate clutch which has a function of engaging and disengaging with and from the high speed driven gear 15 under an operation of a hydraulic actuator 24. Here, when the high speed multi-plate clutch 14 is gradually pressed by the hydraulic actuator 24, the torque of the transmission input shaft 4 is gradually transmitted to the transmission output shaft 19.

The high speed multi-plate clutch 14 is mounted between the transmission input shaft 4 and the transmission output shaft 19, that is, on a high speed driven gear 15 so that a transmission torque from the transmission input shaft 4 to the transmission output shaft 19 can be adjusted.

A rotational speed of the transmission output shaft 19 can be controlled with relation to a load (a road status, a weight of vehicle body, etc.) by controlling a force for pressing the high speed multi-plate clutch 14 by means of the hydraulic actuator 24. In this case, a torque of the engine 1 is transmitted along a transmission course from the engine output shaft 2 to the transmission output shaft 19 successively through the start clutch 3, the transmission input shaft 4, the high speed drive gear 5, a high speed driven gear 15, and the high speed multi-plate clutch 14. (see FIG. 3).

Next, referring to Table 1, a description will be given of a basic processing method for controlling the engine 1 and the motor generator 11 in respective operating modes. Here, with respect to the gear change dog clutch 17, a state that it engages with the low speed driven gear 16 is defined as a 1st position, a state that it engages with the middle speed driven gear 18 is defined as a 2nd position, and an "OFF" state thereof is defined as an N (neutral) position.

prevented from stopping at a time of starting by increasing the torque of the motor generator 11. Further, as another starting method, there is a method of first setting the start clutch 3 to "OFF", thereafter controlling the motor generator 11 so as to synchronously rotate the transmission input shaft 4 and the transmission output shaft 19, engaging the gear change dog clutch 17 with the 1st position, and starting to the torque of the engine 1 while slipping the start clutch 3 as conventionally known or starting by the motor generator 11.

Next, a description will be given of a control method at a time of idling stop (No. 2). The idling stop can be performed by setting the start clutch to "OFF" from the state of the idling power generation (No. 1) and stopping a fuel supply

TABLE 1

Explanation of Operation Modes

| No. | Mode | Operation State | Start Clutch | High Speed Multi-Plate Clutch | Gear change Dog Clutch | MG Dog Clutch | Notes |
|---|---|---|---|---|---|---|---|
| 1 | Stop | Idling power Generation | ON | OFF | N | ON | Engine Start |
| 2 | | Idling stop | OFF | OFF | 1st | ON | |
| 3 | M/G Running | Reverse | OFF | OFF | 1st | ON | Negative Rotation |
| 4 | | Low Vehicle Speed (First Speed) | OFF | OFF | 1st | ON | |
| 5 | | Middle Vehicle Speed (Second Speed) | OFF | OFF | 2nd | ON | Regeneration Brake |
| 6 | | High Vehicle Speed (Third Speed) | OFF | ON | N | ON | |
| 7 | Engine Running | Low Vehicle Speed (First Speed) | ON | OFF | 1st | OFF | |
| 8 | | | ON | OFF | 1st | ON | Assist, Power Generation and Regeneration |
| 9 | | Middle Vehicle Speed (Second Speed) | ON | OFF | 2nd | OFF | |
| 10 | | | ON | OFF | 2nd | ON | Assist, Power Generation and Regeneration |
| 11 | | High Vehicle Speed (Third Speed) | ON | ON | N | OFF | |
| 12 | | | ON | ON | N | ON | Assist, Power Generation and Regeneration |

First, a description will be given of a control method in the stop mode. At a time of idling power generation (No. 1 in Table 1), the start clutch 3 is set to "ON", the high speed multi-plate clutch 14 is set to "OFF", the gear change dog clutch 17 is set to the N (neutral) position, and the motor generator dog clutch 9 is set to "ON". Accordingly, the torque from the engine 1 is transmitted to the motor generator 11 via the middle speed drive gear 7 and the motor generator driven gear 8, and it is possible to generate power while idling the engine 1 in a state that the vehicle stops. Further, in order to realize a smooth start from this state, it is necessary to start the vehicle while slipping the high speed multi-plate clutch 14. After starting, the high speed multi-plate clutch 14 is quickly disengaged, the transmission input shaft 4 and the transmission output shaft 19 are synchronously rotated by using the motor generator 11, an electronically controlled throttle 22 and the like, and the gear change dog clutch 17 is set to the 1st position. At this time, in the case that the gear change ratio of a gear stage having the multi-plate clutch arranged is small, there is a risk that the engine stops without starting. In this case, the engine is to the engine 1. At this time, it is necessary to set the gear change dog clutch 17 to the 1st position for realizing a smooth start from the idling stop. When starting, it is possible to employ a method of starting according to the torque of the motor generator 11 and a method of starting according to the torque of the motor generator 11 and push-starting the engine 1. In the case of push-starting the engine 1, it is necessary to control the rotational speed of the engine 1 within a range capable of starting while slipping the start clutch 3. Further, in the case of push-start, it is significantly effective to utilize an engine with electromagnetic drive type intake and exhaust valves In the conventional type of engine in which the intake and exhaust valves are opened and closed by rotating a cam shaft, there is a cylinder at which the intake and exhaust valves are closed when the engine stops and this generates a great load, so that it is necessary that the motor generator 11 generates a great torque when push-starting. On the contrary, in the engine with the electromagnetic drive type intake and exhaust valves, it is possible to open the valves in all the cylinders when the engine stops and the load is reduced, so that the push-start can be easily performed, it is not necessary that the motor generator 11 outputs a great torque, whereby it is possible to make the motor generator 11 compact. Further, the structure may be made such as to start by the torque of the motor generator 11 according to a conventionally known starter motor (a dotted line 300 in FIG. 1) disposed in the engine side and start engine 1 by the starter motor so as to gradually engage the start clutch and add the torque of the engine 1, thereby running.

Next, a description will be given of a travel by the motor generator 11 When reversing (No. 3), the start clutch 3 is set to "OFF", the motor generator dog clutch 9 is set to "ON", and any one of the low speed driven gear 16, the middle speed driven gear 18 and the high speed driven gear 15 is selected so as to rotate the motor generator 11 in a negative direction (a forward direction of the vehicle is set to a positive direction and a backward direction is set to a negative direction), thereby running. It has been known that a great drive torque is required when reversing, the gear change dog clutch 17 may be set to the 1st position and the high speed multi-plate clutch 14 may be set to "OFF". Further, at a time of backward moving, the vehicle may be backwardly moved by engaging with a reverse gear (not shown) and transmitting the torque of the engine 1 to a wheel 21 while slipping the start clutch 3 as conventionally known. At a time of low vehicle speed (No. 4), the start clutch 3 is set to "OFF", the gear change dog clutch 17 is set to the 1st position, the motor generator dog clutch 9 is set to "ON", the high speed multi-plate clutch 14 is set to "OFF", and the motor generator 11 is positively rotated, thereby running the vehicle. In the same manner, at a time of middle vehicle speed (No. 5), the start clutch 3 is set to "OFF", the gear change dog clutch 17 is set to the 2nd position, the motor generator dog clutch 9 is set to "ON", and the high speed multi-plate clutch 14 is set to "OFF". Further, at a time of high vehicle speed (No. 6), the start clutch 3 is set to "OFF", the gear change dog clutch 17 is set to the N (neutral) position, the motor generator dog clutch 9 is set to "ON", and the high speed multi-plate clutch 14 is set to "ON". Further, in the drive modes Nos. 3 to 6 mentioned above, since the motor generator 11 is directly connected to the transmission output shaft 19, the energy can be regenerated at a time of reducing the speed. Further, in the drive modes Nos. 4 to 6 mentioned above, it is possible to control the start clutch 3 so as to push-start the engine 1. Further, as mentioned above, it is possible to start the engine 1 by the starter motor and control the start clutch 3, thereby running according to the torque of the engine 1.

Next, a description will be given of a travel by the engine 1 at a time of low vehicle speed (in a first speed drive state). The start clutch 3 is set to "ON", the high speed multi-plate clutch 14 is set to "OFF", the gear change dog clutch 17 is set to the 1st position, and the motor generator dog clutch 9 is set to "OFF" (No. 7). At this time, it is possible to run at a low vehicle speed by the engine 1. Further, the start clutch 3 is set to "ON", the high speed multi-plate clutch 14 is set to "OFF", the gear change dog clutch is set to the 1st position, and the motor generator dog clutch 9 is set to "ON" (No. 8). At this time, in the case that a residual capacity of the battery 13 is a little and a necessity of generating power by driving the motor generator 11 by means of the engine 1 is generated, running by the engine 1 and the power generation by the motor generator 11 can be performed. Further, in the case that the battery 13 is fully charged and has the residual capacity in reserve, a torque assist can be performed by the motor generator 11, and running can be performed by the engine 1 and the motor generator 11. Further, in the drive motor No 8 mentioned above, since the motor generator 11 is directly connected to the transmission output shaft 19, energy can be regenerated when reducing the speed.

Next, a description will be given of running by the engine 1 at the middle vehicle speed time (in the second speed drive state).

The start clutch 3 is set to "ON", the high speed multi-plate clutch 14 is set to "OFF", the gear change dog clutch 17 is set to the 2nd position, and the motor generator dog clutch 9 is set to "OFF" (No. 9). At this time, it is possible to run at middle vehicle speed by the engine 1. Further, the start clutch 3 is set to "ON", the high speed multi-plate clutch 14 is set to "OFF", the gear change dog clutch is set to the 2nd position, and the motor generator dog clutch 9 is set to "ON" (No. 10). In the same manner as that at the low vehicle speed time, in the case that a residual capacity of the battery 13 is a little and a necessity of generating power by driving the motor generator 11 by means of the engine 1 is generated, running by the engine 1 and the power generation by the motor generator 11 can be performed. Further, in the case that the battery 13 is fully charged and has the residual capacity in reserve, a torque assist can be performed by the motor generator 11, and running can be performed by the engine 1 and the motor generator 11. Further, in the drive motor No. 10 mentioned above, since the motor generator 11 is directly connected to the transmission output shaft 19, an energy can be regenerated when reducing the speed.

Next, a description will be given of running by the engine 1 at the high vehicle speed time (in the third speed drive state).

The start clutch 3 is set to "ON", the high speed multi-plate clutch 14 is set to "OFF", the gear change dog clutch 17 is set to the N (neutral) position, and the motor generator dog clutch 9 is set to "OFF" (No. 11). At this time, it is possible to run at high vehicle speed by the engine 1. Further, the start clutch 3 is set to "ON", the high speed multi-plate clutch 14 is set to "OFF", the gear change dog clutch as set to the N (neutral) position, and the motor generator dog clutch 9 is set to "ON" (No. 12). In the same manner as that at the low and middle vehicle speed times, in the case that a residual capacity of the battery 13 is a little and a necessity of generating power by driving the motor generator 11 by means of the engine 1 is generated, running by the engine 1 and the power generation by the motor generator 11 can be performed. Further, in the case that the battery 13 is fully charged and has the residual capacity in reserve, a torque assist can be performed by the motor generator 11, and running can be performed by the engine 1 and the motor generator 11. Further, in the drive motor No. 10 mentioned above, since the motor generator 11 is directly connected to the transmission output shaft 19, an energy can be regenerated when reducing the speed.

In the case where the start clutch 3 is in trouble and becomes in an always connected state, it is possible to start by using the high speed multi disc clutch 14. At this time, in the case where the speed change ratio of a gear on which the high speed multi disc clutch 14 is mounted is the minimum, the engine might stop, so that it is desirable that the high speed multi disc clutch 14 is mounted on the gear having the speed change ratio being equal to or more than 1, for example, the speed change ratio corresponding to the third speed.

Further, at a time of running by the engine 1 mentioned above, in the case that the power generation and the torque assist by the motor generator 11, it is necessary to control the motor generator 11 so as to synchronously rotate the motor generator output shaft 10 and the transmission input shaft 4.

Further, in the structure according to the invention, it is possible to regenerate the energy at the speed reduction time in all the drive modes during running. For example, in the drive modes No. 7, 9 and 11 mentioned above, when synchronizing the transmission input shaft 4 and the motor generator output shaft 10 and setting the motor generator dog clutch 9 to "ON" at the speed reduction time, the energy can be regenerated.

Further, since the motor generator 11 serves as a starter for starting the engine 1, a gear ratio between the middle speed drive gear 7 and the motor generator driven gear 8 is designed so as to transmit the torque from the transmission input shaft 4 to the motor generator 11 in an increasing manner. Accordingly, since it is possible to reduce the torque of the motor generator 11 required at a time of starting the engine 1 and the torque of the motor generator 11 is transmitted to the transmission input shaft 4 in a reducing manner, it is possible to reduce the torque of the motor generator 11 required when running and assisting torque by the motor generator 11, so that it is possible to make the motor generator 11 compact and light.

Further, in the conventional embodiment, two pairs of gear trains are provided in a transmission course between the engine and the motor generator, however, in the embodiment according to the present invention, the gear trains are reduced to one pair. Accordingly, a transmission efficiency when generating power by the engine 1 can be improved and the specific fuel consumption can be further reduced.

Figure 2:
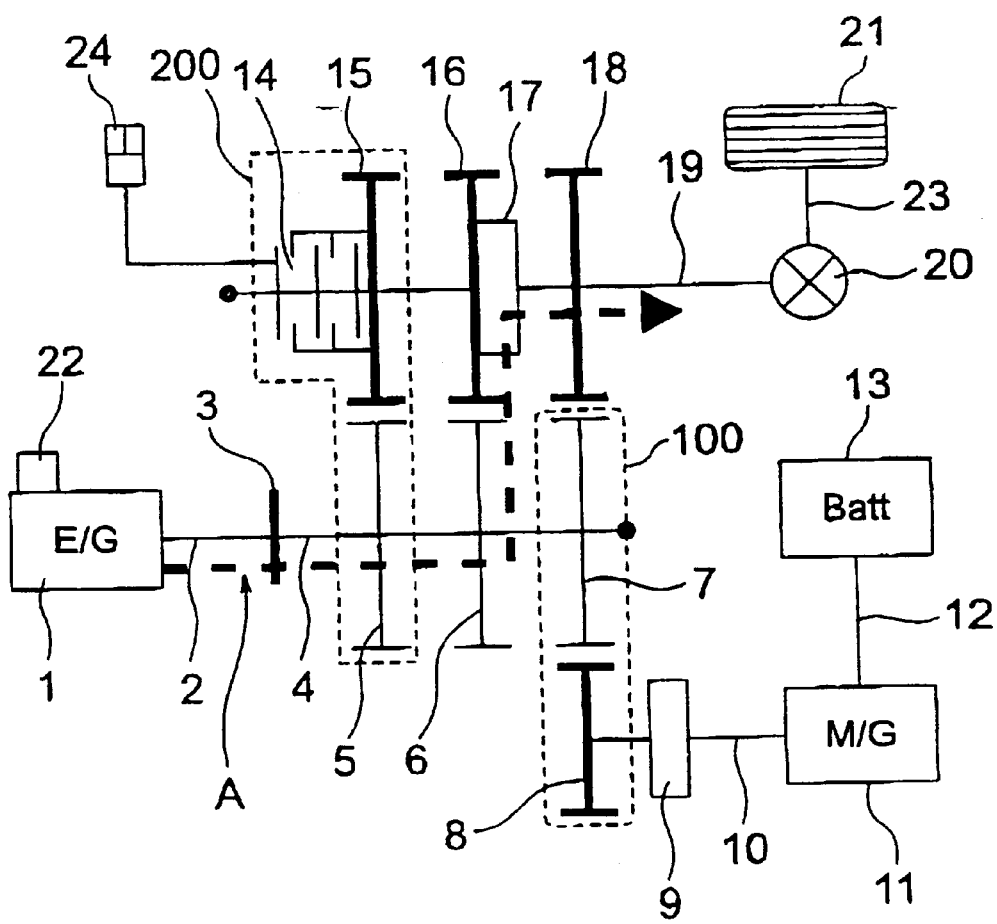
FIG. 2 is the driving system shown in FIG. 1, which shows a torque transmission course when running by an engine driving force.

FIG. 2 is a schematic view in the case of accelerating the vehicle in a state of running by the drive force of the engine. A dotted thick line in FIG. 2 shows a transmission course of the torque. As an example, a case of engaging the start clutch 3 and engaging the gear change dog clutch 17 with the low speed driven gear 16 is supposed. At this time, the torque of the engine 1 is transmitted to the transmission output shaft 19 via the low speed drive gear 6 and the low speed driven gear 16. Here, in the case of accelerating the vehicle, since the motor generator 11 is intercepted from the transmission input shaft 4 by the motor generator dog clutch 9 and the inertia torque of the motor generator 11 can be reduced, it is not necessary to increase the torque of the engine 1 and the specific fuel consumption can be reduced at a time of acceleration.

Figure 3:
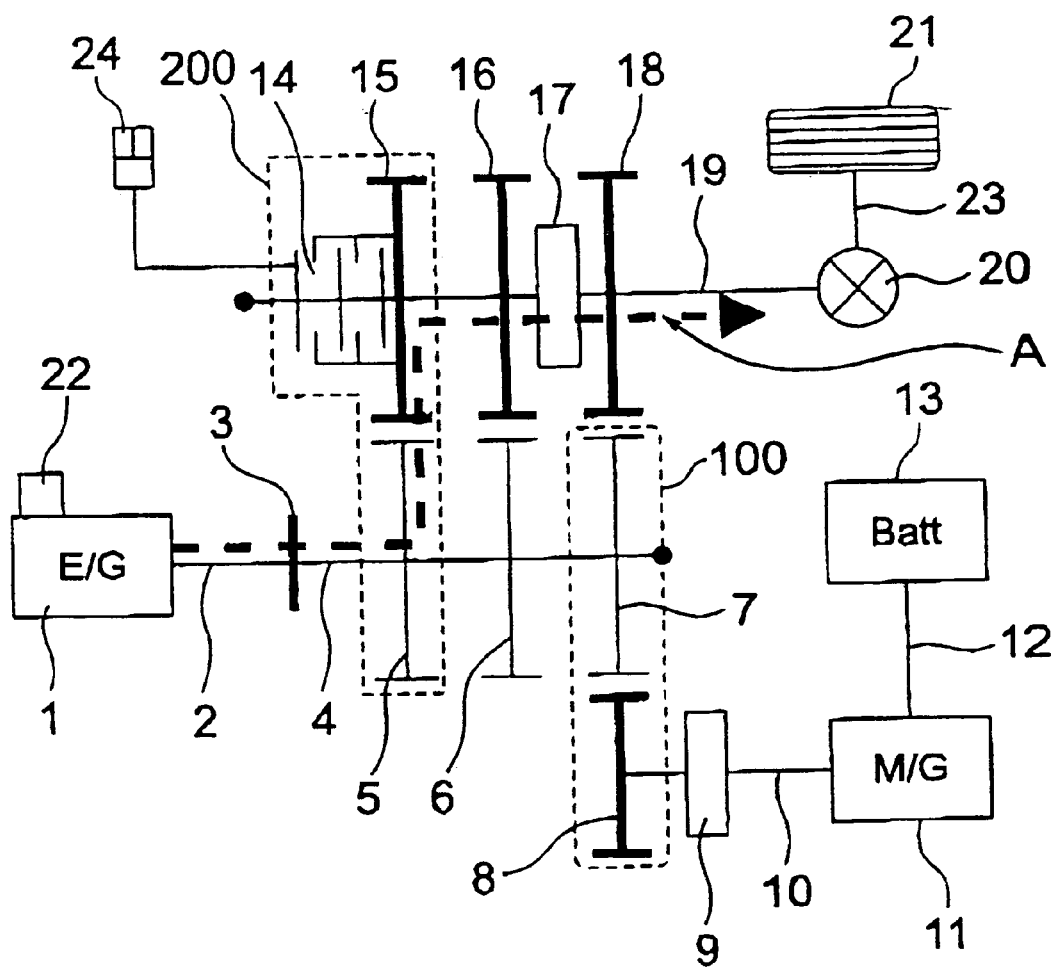
FIG. 3 is the driving system shown in FIG. 1, which shows a torque transmission course during a gear change operation.
Figure 4:
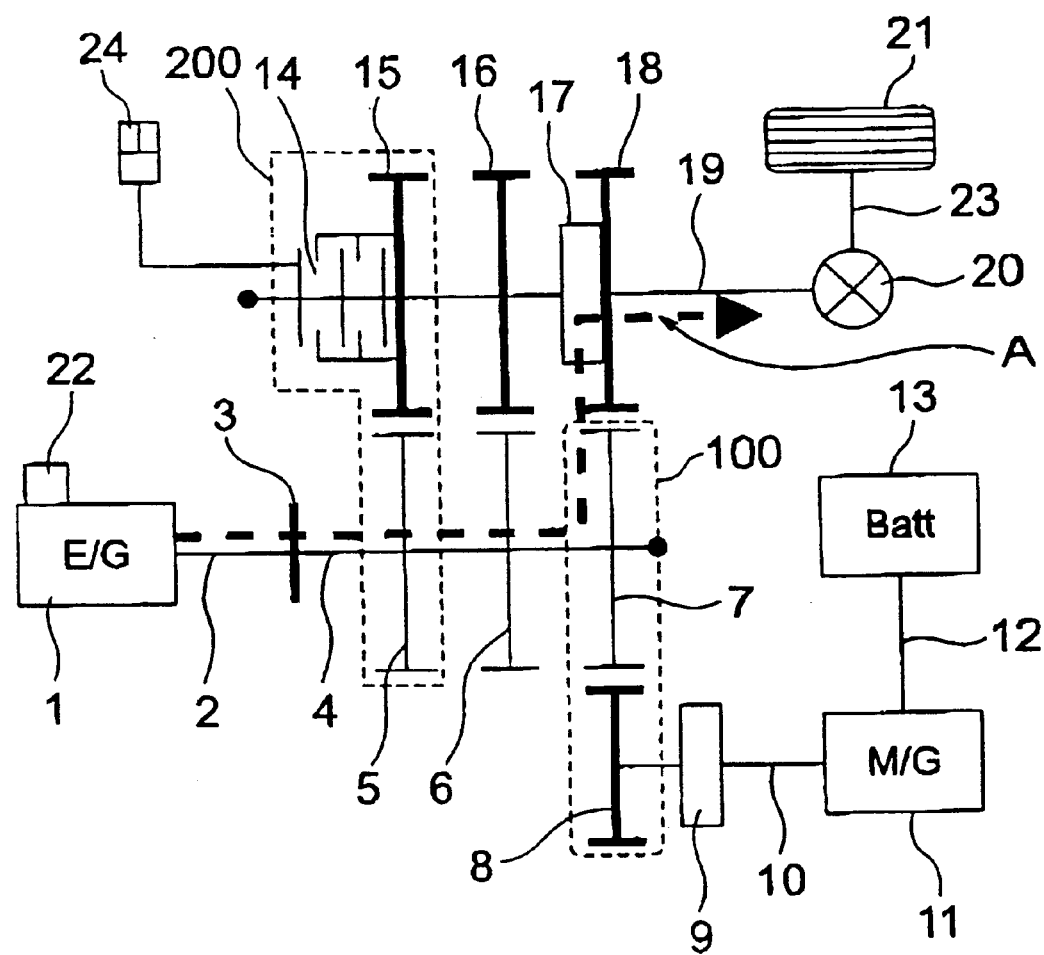
FIG. 4 is the driving system shown in FIG. 1, which shows a torque transmission course after the gear change operation.

FIGS. 3 and 4 are schematic views in the case of changing speed from the first speed drive state in FIG. 3 to the second speed drive state. When the vehicle speed becomes in the gear change state, the gear change dog clutch 17 is made in the disengaged state so as to disengage a connection between the low speed driven gear and the transmission output shaft 19 as shown in FIG. 4. At the same time, the torque of the engine 1 is transmitted to the transmission output shaft 19 via the high speed driven gear 15 by controlling the hydraulic actuator 24 so as to press the high speed multi-plate clutch 14. The torque of the engine 1 is transmitted to the wheel axle 23 due to the pressing force of the high speed multi-plate clutch 14 so as to become a drive torque for the vehicle, and the rotational speed of the engine 1 is reduced due to the increased load of the engine 1 because the gear change ratio is reduced by the high speed driven gear, so that the gear change ratio between the transmission output shaft 19 and the transmission input shaft 4 becomes close to the gear change ratio of the second speed from the gear change ratio of the first speed (in the direction of becoming small). At this time, the torque of the engine 1 is transmitted according to a transmission course from the engine output shaft 2 to the transmission output shaft 19 successively through the start clutch 3, the transmission input shaft 4, the high speed drive gear 5, the high speed multi-plate clutch 14 and the high speed driven gear 15. Here, when the gear change ratio between the transmission input shaft 4 and the transmission output shaft 19 becomes the gear change ratio of the second speed, the gear change dog clutch 17 engages with the middle speed driven gear 18 so as to engage the middle speed driven gear 18 with the transmission output shaft 19 as shown in FIG. 4. When the connection is completed, the hydraulic actuator 24 is controlled so as to release the pressing force of the high speed multi-plate clutch 14, whereby the gear change from the first speed to the second speed is completed. At this time, the torque of the engine 1 is transmitted according to a transmission course from the engine output shaft 2 to the transmission output shaft 19 successively through the start clutch 3, the transmission input shaft 4, the middle speed drive gear 6 and the middle speed driven gear 15.

As mentioned above, the first speed is disengaged at a time of gear change so as to become the neutral state, however, at this time, since the torque of the engine 1 is transmitted to the wheel axle 23 by the high speed multi-plate clutch 14, the high speed drive gear 5 and the high speed driven gear 15, it is not necessary that the driver returns the acceleration pedal (that is, it is not necessary that the torque and the rotational speed of the engine 1 are adjusted). According to this structure, it is possible to change speed of the gear transmission while accelerating the vehicle. On the contrary, in the case that the driver returns the acceleration pedal and controls the electronically controlled throttle 22 so as to narrow the throttle during the driving, a rotational synchronization between the transmission input shaft 4 and the transmission output shaft 19 by the high speed multi-plate clutch 14 becomes early (the rotational speed of the engine 1 is early reduced), so that it is possible to shorten a time for changing the speed.

In the case of changing the speed to the third speed, it is possible to achieve the gear change by controlling the hydraulic actuator 24 so as to make the pressing force of the high speed multi-plate clutch 14 maximum and making the gear change dog clutch 17 in a disengaged state (neutral). Here, in the case of increasing the gear change ratio (shift down), the hydraulic actuator 24 may be controlled so as to obtain a target gear change ratio in a state in FIG. 3, whereby the pressing force of the high speed multi-plate clutch 14 may be adjusted. Further, the control method during the gear change mentioned above can be realized in running mode by the motor generator 11, the mode of running by the engine 1 and generating power by the motor generator 11, and running mode by the engine 1 and the motor generator 11, in addition to running mode by the engine 1 as shown in the embodiment.

Figure 5:
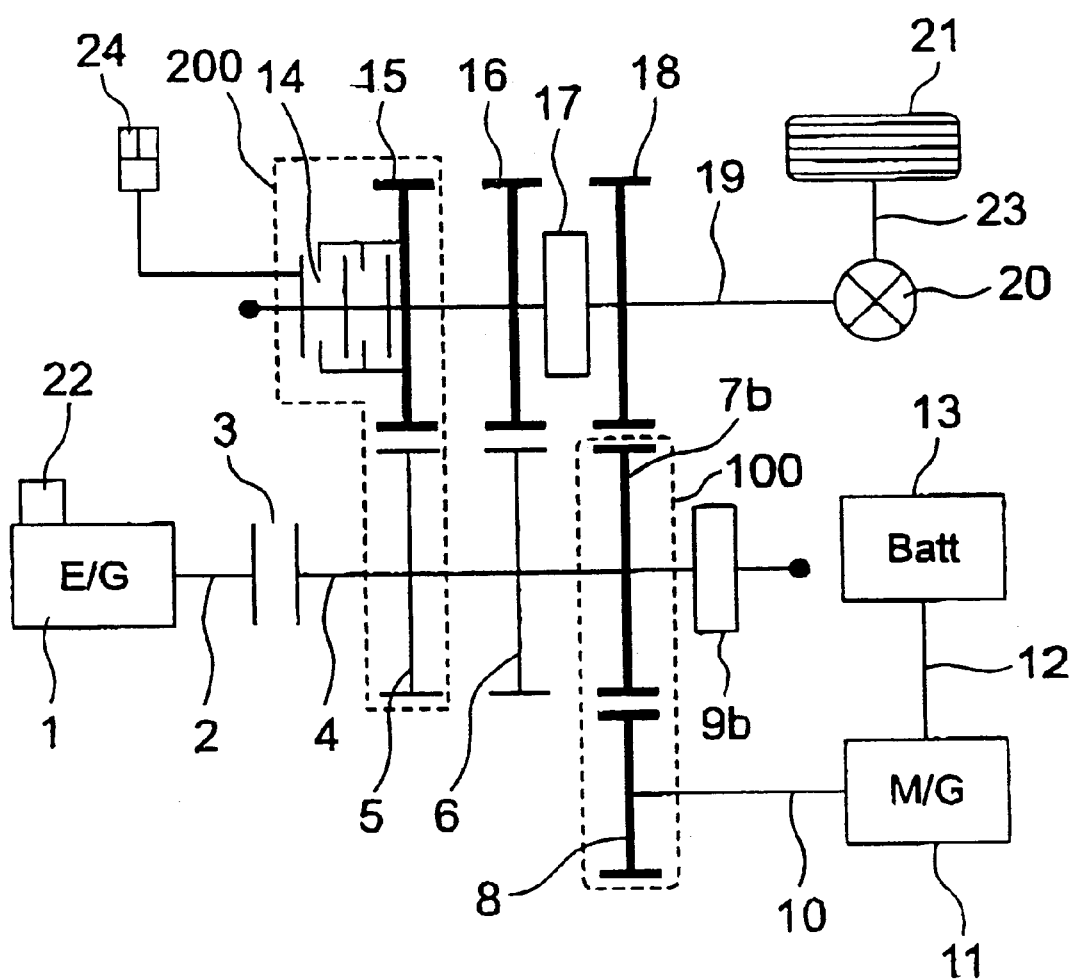
FIG. 5 is a schematic view of a drive system of a motor vehicle according to a second embodiment of the invention.

FIG. 5 is a schematic view of a whole of an automobile system according to a second embodiment of the invention. This system corresponds to a structure in which a motor generator dog clutch 9 is arranged in a side of the transmission input shaft 4 and a middle speed drive gear 7b is accordingly arranged so as to freely rotate with respect to the transmission input shaft 4, in the structure shown in FIG. 1. Further, a motor generator driven gear 8b is fixed to the motor generator output shaft 10. The other structures are the same as those shown in FIG. 1, the same reference numerals as those in FIG. 1 are provided to the same elements in FIG. 5, and a description thereof will be omitted. Further, when employing the structure, there is a disadvantage that the motor generator 11 is rotated in an accompanying manner when running according to the engine 1 in the drive mode No. 9 shown in Table 1, however, it is possible to disengage the motor generator 11 when running according to the engine 1 in the other drive modes, and since the inertia torque of the motor generator 11 can be reduced in the case of accelerating the vehicle, it is not necessary to increase the torque of the engine 1, whereby the specific fuel consumption can be reduced when accelerating.

Figure 6:
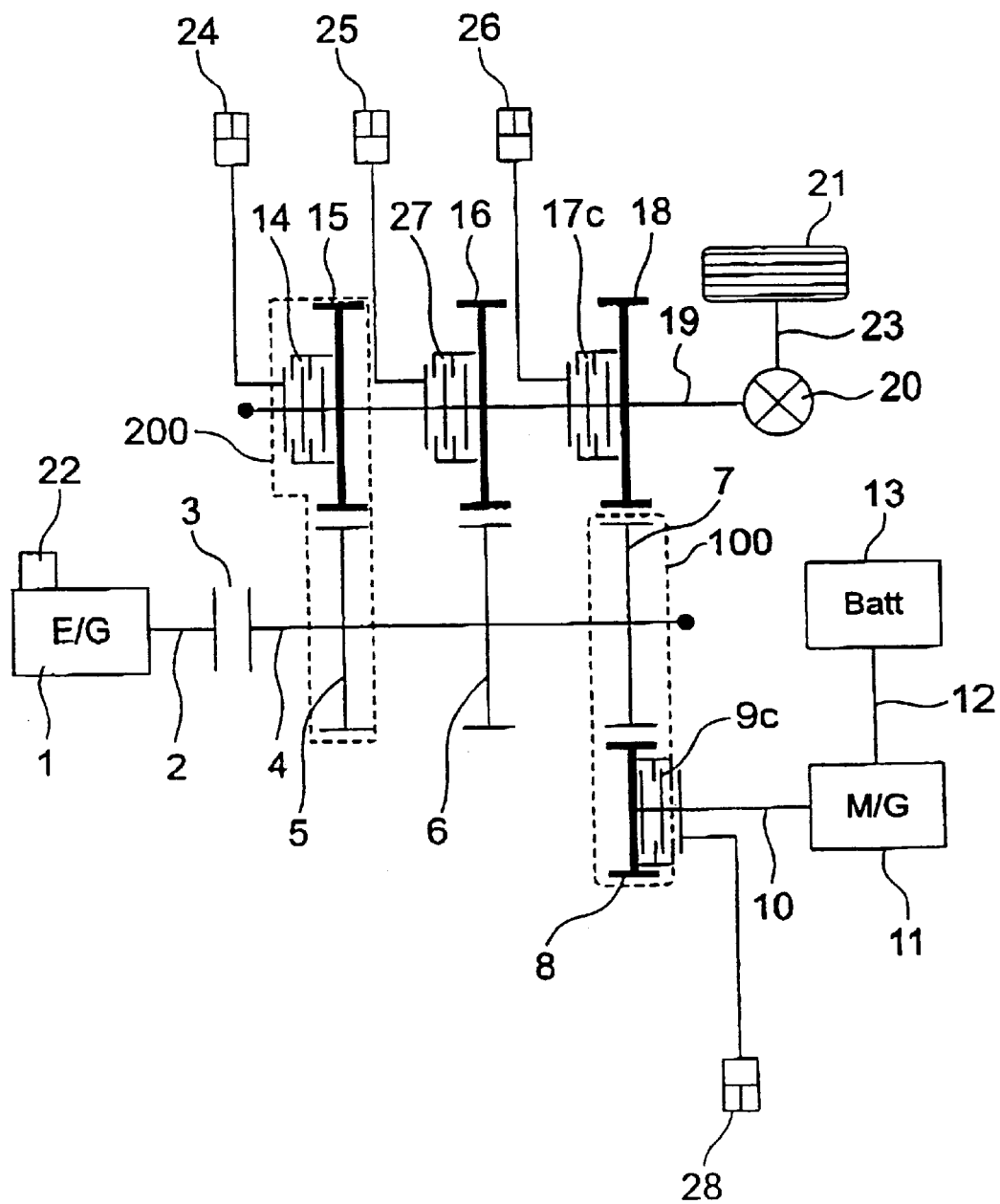
FIG. 6 is a schematic view of a drive system of a motor vehicle according to a third embodiment of the invention.

FIG. 6 is a schematic view of a whole of an automobile system according to a third embodiment of the invention. This system corresponds to a structure in which a low speed multi-plate clutch 27 and a middle speed multi-plate clutch 17c are respectively arranged with respect to the low speed driven gear 16 and the middle speed driven gear 18 in place of the gear change dog clutch 17 and a motor generator multi-plate clutch 9c is arranged in place of the motor generator dog clutch 9, in the structure shown in FIG. 1. Also in this structure, it is possible to realize the same effect as the effect of engaging and disengaging the gear change dog clutch 17 and the motor generator dog clutch 9 shown in FIG. 1. For example, when controlling the low speed hydraulic actuator 25 so as to make the pressing force of the low speed multi-plate clutch 27 maximum, the low speed driven gear 16 and the transmission output shaft 19 are connected so as to become in the sane state as the state of setting the gear change dog clutch 17 to the 1st position in FIG. 1. In the same manner, when controlling the middle speed hydraulic actuator 26 so as to make the pressing force of the middle speed multi-plate clutch 17c maximum, the middle speed driven gear 17 and the transmission output shaft 19 are connected so as to become in the same state as the state of setting the gear change dog clutch 17 to the 2nd position in FIG. 1.

Further, when controlling the low speed hydraulic actuator 25 and the middle speed hydraulic actuator 26 so as to release the pressing force of the low speed multi-plate clutch 27 and the middle speed multi-plate clutch 17c, the structure becomes in the same state as the state of setting the gear change dog clutch 17 to the N (neutral) position in FIG. 1. In the same manner, when controlling the motor generator hydraulic actuator 28 so as to adjust the pressing force of the motor generator multi-plate clutch 9c maximum, the state of turning on and off the motor generator dog clutch 9 can be realized. The other structures are the same as the structures shown in FIG. 1, the same reference numerals as those in FIG. 1 are attached to the same elements in FIG. 6, and a description thereof will be omitted.

Figure 7:
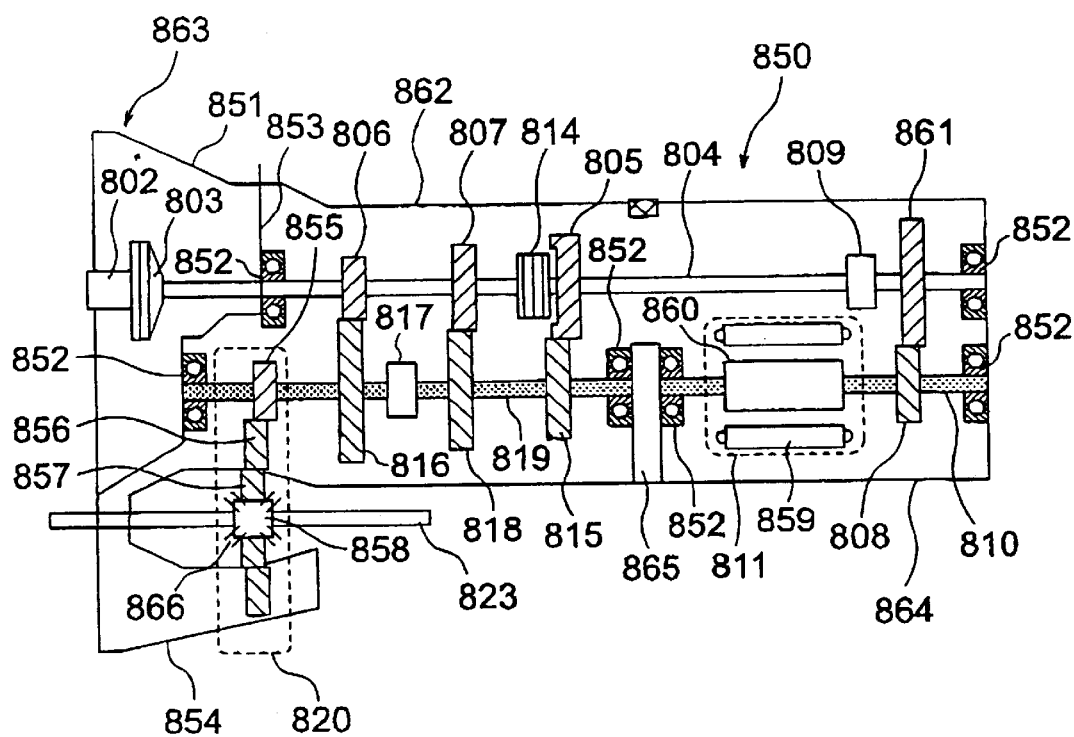
FIG. 7 is a schematic view of a transmission of a front engine front drive vehicle (FF vehicles) to which the invention is applied.

FIG. 7 is a schematic view of a Transmission for a front engine front drive vehicle (an FF vehicle) to which the present invention is applied. A transmission input shaft 804 and a transmission output shaft 819 are arranged in an inner portion of a housing 850 so as to be in parallel to each other and freely rotate. The housing 850 is constituted by a substantially cylindrical main body portion 862, a clutch housing 851 and a differential gear housing 854 which are integrally formed, a front portion 863 mounted to a front end side of the main body portion 862 and an extension portion 864 mounted to a rear end side of the main body portion 862. A supporting portion 865 extending to a center side from an inner peripheral surface is formed in a rear end side of the main body portion 862, a partition wall portion 853 is formed in the front portion 863, the transmission input shaft 804 extends through the partition wall portion 853, and one end portion thereof extends to a bearing 852 mounted t a rear end side of the extension portion 864, whereby the transmission input shaft 804 is rotatably supported via the partition wall portion 853 and the bearing 852. A start clutch 803 is mounted to an end portion protruding into the clutch housing 851 of the transmission input shaft 804, and the transmission input shaft 804 is connected to an engine output shaft 802 via the start clutch 803. On the contrary, the transmission output shaft 819 is rotatably supported to bearings 852 respectively mounted to the partition wall portion 853 and a supporting portion 865. Further, a motor generator output shaft 810 is arranged on the same axis as the transmission output shaft 819. The motor generator shaft 810 is rotatably held by the bearings 852 respectively arranged in the supporting portion 865 and an inner surface of the extension portion 864. A motor generator 811 is installed within the extension portion 864, and a motor generator output shaft 810 is integrally formed with a rotor 860 thereof.

Further, a motor generator driven gear 608 is integrally mounted to the motor generator output shaft 810, and a motor generator drive gear 861 always engaging with the motor generator driven gear 808 is rotatably arranged on the same axis as the transmission input shaft 804. Reference numerals 809 denote a motor generator dog clutch, and has a function of engaging or disengaging the motor generator drive gear 861 with respect to the transmission input shaft 804. The differential gear housing 854 is formed in an outer side in a radial direction of the clutch housing 851 mentioned above, a differential gear carrier 858 holding a pinion 857 and a pair of right and left side gears 866 engaging with the pinion 857 are provided in an inner portion thereof, and a ring gear 856 is integrally mounted to the differential gear carrier 858. Then, a drive gar 855 engaging with the ring gear 856 is integrally mounted to the transmission output shaft 819, and a portion 820 obtained by surrounding the pinion 857, the differential gear carrier 858, the side gear 866, the ring gear 856 and the drive gear 855 is totally called as a final gear. In this case, reference numerals 823 denote a front wheel drive shaft, and these elements are connected to the side gear 866.

Figure 8:
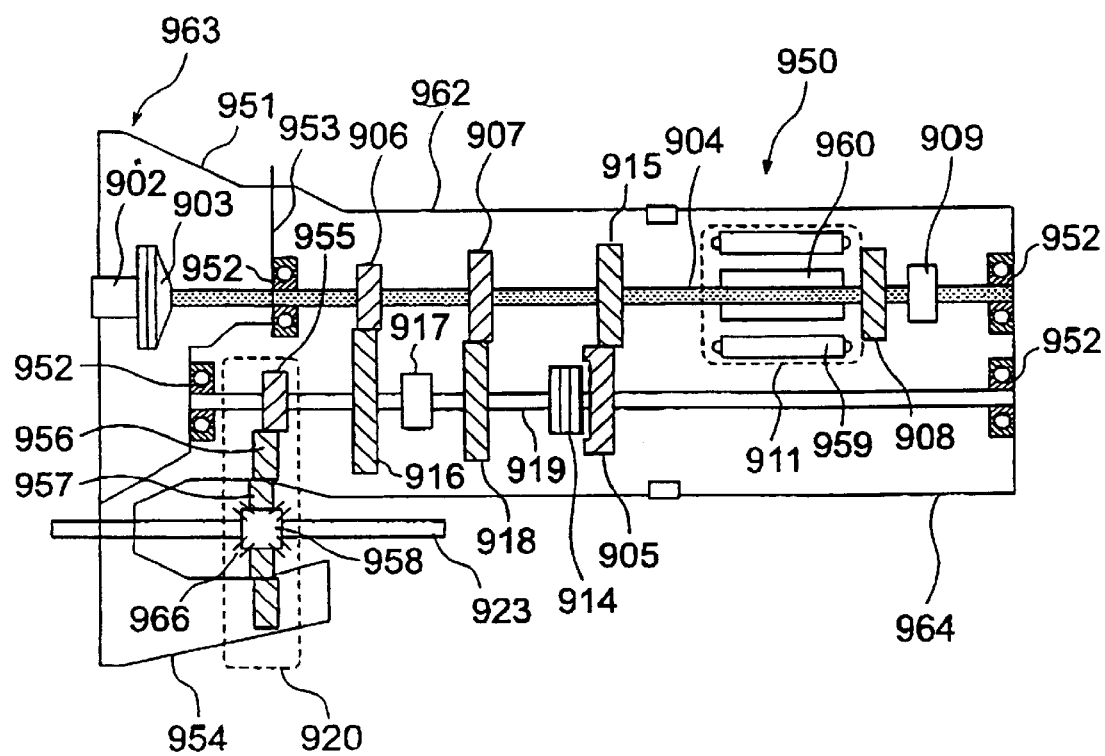
FIG. 8 is a schematic view of another transmission of the FF vehicles to which the invention is applied.

FIG. 8 is a schematic view of a Transmission for the front engine front drive vehicle (the FF vehicle) to which the present invention is applied, in the same manner as FIG. 7, in which a method of arranging the motor generator and the high speed multi-plate clutch is changed. In FIG. 8, a transmission output shaft 919 extends to a rear end side of an extension portion 964 and is rotatably supported by bearings 952 respectively arranged in a main body portion 962 and an inner surface of the extension portion 964. Further, a rotor 960 of the motor generator 911 corresponds to an output shaft of the motor generator and the rotor 960 is integrally formed with a motor generator driven gear 908. The motor generator driven gear 908 and the rotor 960 integrally formed with each other are rotatably arranged on the same axis as the transmission input shaft 904, and the structures is made such that the motor generator 911 is directly connected to the transmission input shaft 904 by engaging a motor generator dog clutch 909 with a motor generator driven gear 908. Further, a high speed driven gear 905 and a transmission output shaft 919 are connected by pressing a high speed multi-plate clutch 914. At this time, a torque from the transmission input shaft 904 is transmitted according to a transmission course from the transmission input shaft 904 to the transmission output shaft 919 successively through the high speed drive gear 915, the high speed driven gear 905 and the high speed multi-plate clutch 914. Since the other structures are the same as those in FIG. 8, a description thereof will be omitted.

Figure 9:
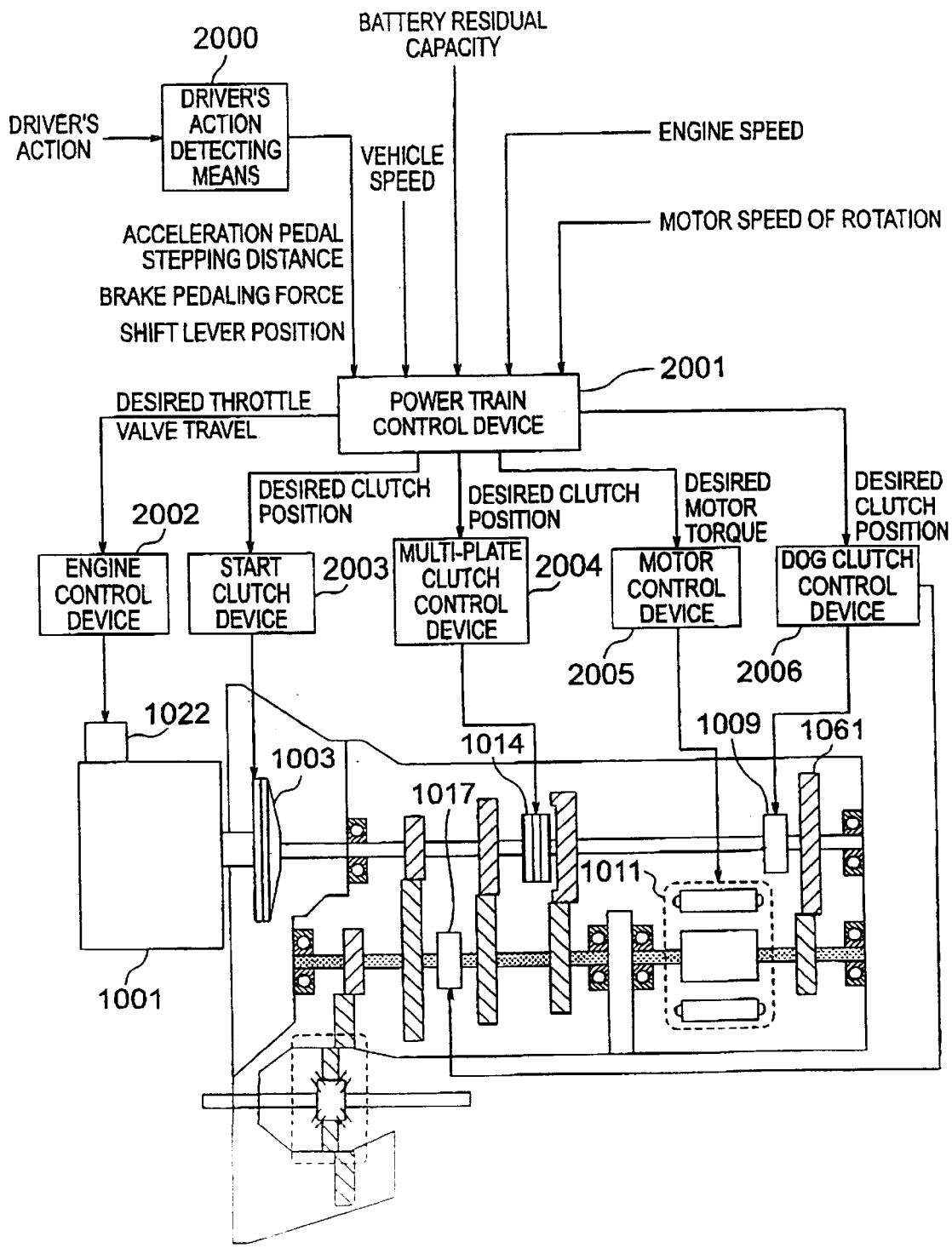
FIG. 9 is a schematic view showing a control system of a hybrid motor vehicle to which the invention is applied.

FIG. 9 is a schematic view showing a control device of a hybrid vehicle employing the Transmission shown in FIG. 7. Reference numerals 2000 in FIG. 9 denote driver's intention detecting means. The driver's intention detecting means normally corresponds to an acceleration pedal, a brake pedal and a shift lever. Reference numerals 1001 denote an engine, in the engine 1001, an amount of intake air is controlled by an electronically controlled throttle 1022 provided in an intake pipe (not shown), and an amount of fuel corresponding to the amount of air is injected from a fuel injection apparatus (not shown). Further, an ignition timing is determined from signals such as an air-fuel ratio, an engine rotational speed or the like determined by the amount of air and the amount of fuel. Reference numerals 2002 denote an engine control device. The engine control device 2002 is an apparatus for controlling the engine by the electrically controlled throttle 1022, and for example, constituted by a micro computer, an electric circuit, a motor and the like. An acceleration pedal opening degree, a brake pedaling force, a position of the shift lever, a residual capacity of the battery, a vehicle speed, an engine rotational speed, a motor rotational speed are input to a power train control device 2001 in FIG. 9. Further, the power train control device 2001 controls so that a torque of the engine 1001 is calculated, a throttle valve opening degree for achieving the engine torque is calculated so as to be transmitted to the engine control device 2002 by communicating means, and the electronically controlled throttle 1022 achieves a desired throttle valve opening degree.

Further, in the power train control device 2001, a torque of the motor generator 1011 is calculated so as to be transmitted to a motor control device 2005 by communicating means, whereby each of actuators is controlled. The motor control device 2005 charges an electric power generated by the engine 1001 and a regeneration electric power obtained at a time of reducing the speed of the vehicle into the battery, or supplies the electric power from the battery for driving the motor generator 1011, in correspondence to the volume of the battery. Further, in FIG. 9, reference numerals 1003 denote a start clutch, 1014 a high speed multi-plate clutch, 1017 a gear change dog clutch and 1009 a motor generator dog clutch. In the power train control device 2001, a target start clutch position is calculated so as to be transmitted to a start clutch control device 2003 by communicating means, whereby the start clutch 1003 is controlled. In the same manner, the high speed multi-plate clutch 1014 is controlled by a multi-plate clutch control device 2005, and the gear change dog clutch 1017 and the motor generator dog clutch 1009 are controlled by a dog clutch control device 2006.

Figure 10:
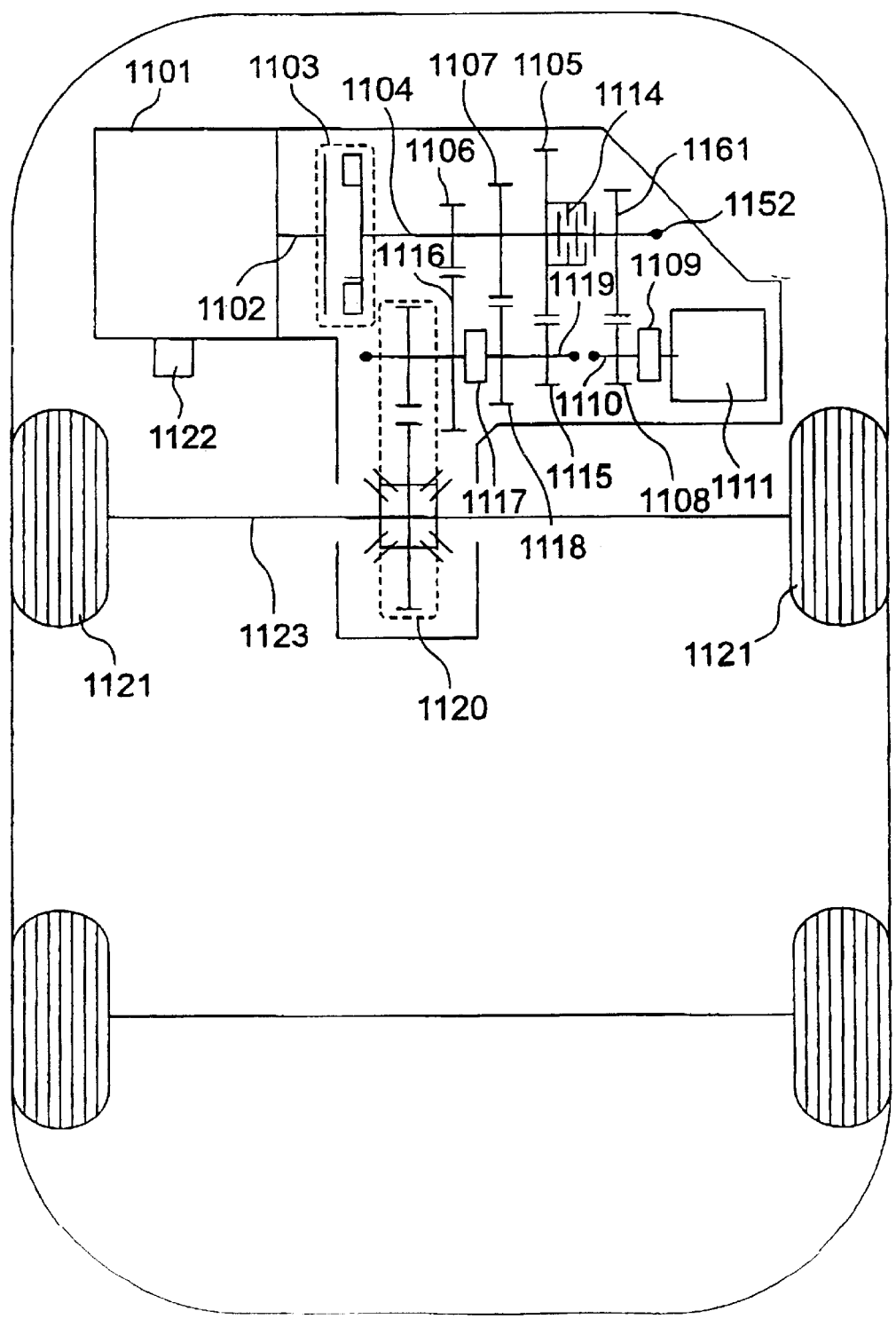
FIG. 10 is a schematic view of a hybrid motor vehicle in which a transmission according to the invention is provided in a front wheel side.

FIG. 10 is an idiomatic view of a hybrid vehicle in which the Transmission shown in FIG. 7 is provided in a front wheel side. As shown in FIG. 10, it is possible to mount the Transmission to the automobile without adding the motor generator to the drive wheel side (for example, in a rear wheel side).

Figure 11:
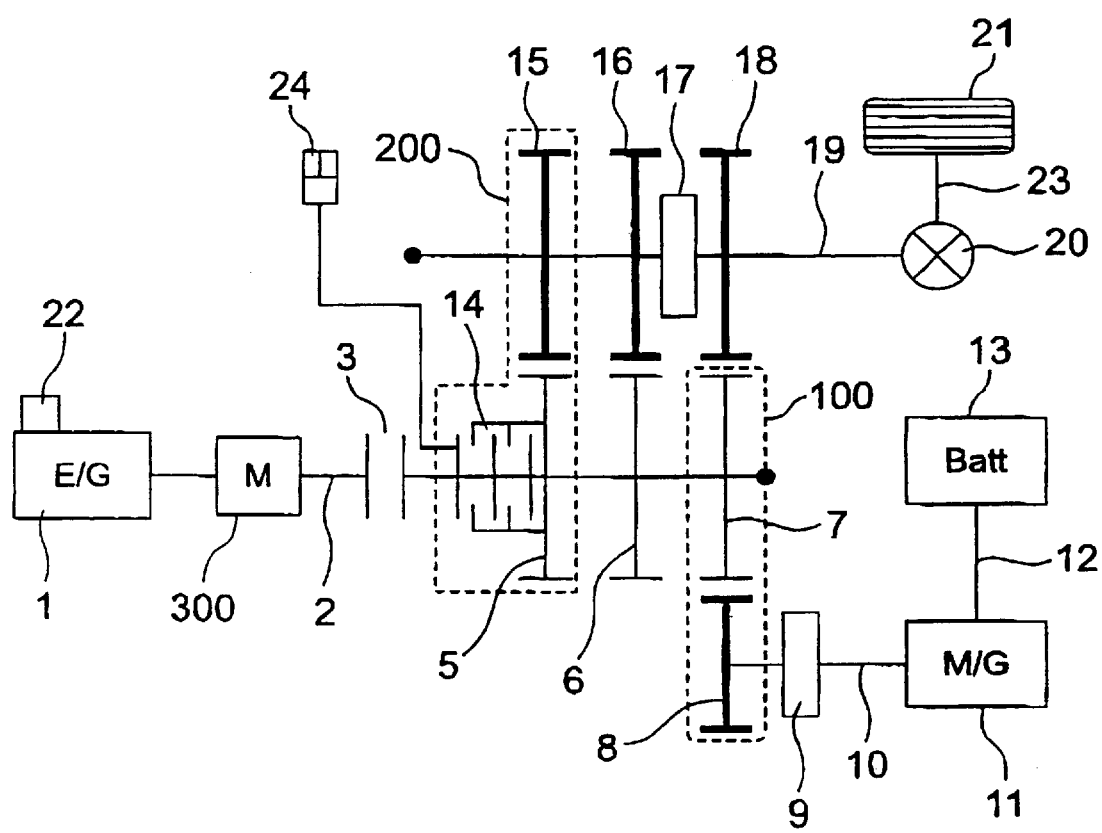
FIG. 11 is a schematic view of a drive system of motor vehicles according to a fourth embodiment of the invention.

FIG. 11 is a schematic view of a system (a fourth embodiment of the present invention) in which a motor 300 is added between the engine 1 and the start clutch 3 in the Transmission shown in FIG. 1 and the high speed multi-plate clutch is arranged in a side of the transmission input shaft. The motor 300 is used for starting the engine 1 and driven by the engine 1 so as to generate power. Further, when reducing speed, the start clutch 3 is set to "ON", so as to regenerate. Further, in the case that the residual capacity of the battery is sufficient, the motor 300 can be used for assisting torque, whereby a great drive force can be obtained. Further, the high speed drive gear 5 and the transmission input shaft 4 are connected by pressing the high speed multi-plate clutch 14. At this time, a torque from the transmission input shaft 4 is transmitted according to a transmission course from the transmission input shaft 4 to the transmission output shaft 19 successively through the high speed multi-plate clutch 14, the high speed drive gear 5 and the high speed driven gear 15. The other structures are the same as the structures shown in FIG. 1, the same reference numerals in FIG. 1 are attached to the same elements in FIG. 11, and a description thereof will be omitted.

Figure 12:
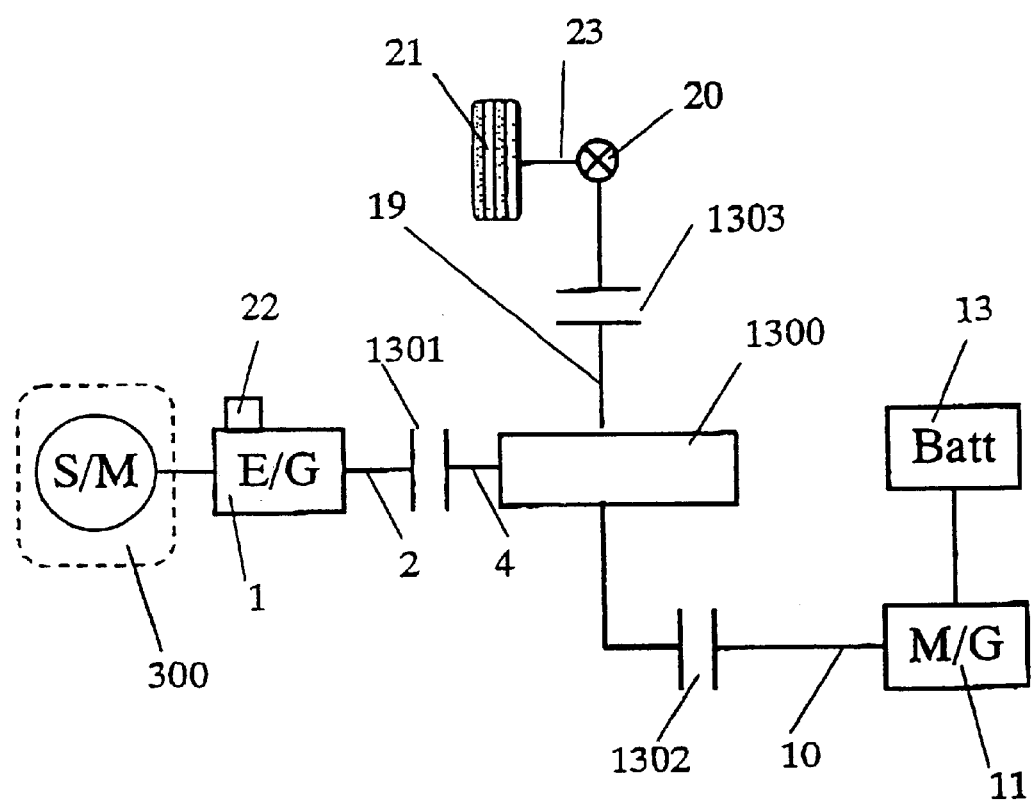
FIG. 12 is a schematic view of a drive system of motor vehicles according to a fifth embodiment of the invention.

FIG. 12 is a schematic view of a motor vehicle system in accordance with a fifth embodiment of the present invention. Reference numeral 1 denotes an engine, 22 an electronically controllable throttle, and 300 a starter motor for starting the engine. Further, reference numeral 1301 denotes a first clutch having a function of adjusting a torque transmitted to the transmission input shaft 4 from the engine output shaft 2. Reference numeral 11 denotes a motor generator which outputs a kinetic energy by an electric energy provided from a battery 13. The motor generator 11 converts the applied kinetic energy into an electric energy to store in the battery 13, Reference numeral 21 denotes a tire and 23 a wheel axle. Reference numeral 1300 denotes a gear change apparatus having a mechanism which transmits a torque from the engine 1 or the motor generator 11 to the transmission output shaft 19 in a speed increasing or reducing manner. Reference numeral 1302 denotes a second clutch having a function of adjusting the torque transmitted to the transmission output shaft 19 from the motor generator output shaft 10 via the gear change apparatus 1300. Further, reference numeral 1303 denotes a third clutch having a function of adjusting the torque transmitted to the wheel axle 23 from the transmission output shaft 19.

Table 2 is a view explaining each of operating modes in accordance with the fifth embodiment of the invention.

TABLE 2

Explanation of Operation Modes

| No. | Mode | Operation State | First Clutch | Second Clutch | Third Clutch | Notes |
|---|---|---|---|---|---|---|
| 1 | Stop | Idling power generation | ON | ON | OFF | Engine Start |
| 2 | | Idling stop | OFF | ON | ON | |
| 3 | Run by M/G | Reverse run | OFF | ON | ON | Negative Rotation Regeneration Brake |
| 4 | | Forward run | OFF | ON | ON | |
| 5 | Run by Engine | Only Engine | ON | OFF | ON | No operation of M/G |
| 6 | | Motor assist | ON | ON | ON | Regeneration Brake |

First, a description will be given of a control method in a stop mode.

At a time of idle power generation (No. 1), the first clutch 1302 is turned on, the second clutch 1302 is turned on and the third clutch 1303 is turned off. Accordingly, the torque from the engine 1 is transmitted to the motor generator 11, and it is possible to generate power while idling the engine 1 when the vehicle is stopped.

Next, a description will be given of a control method at a time of idle stop (No. 2). The idle stop can be performed by turning off the first clutch 1301 from the state of the idle power generation (No. 1) and cutting a fuel supply to the engine 1. At this time, it is necessary to set the third clutch 1303 to the on position for realizing a smooth start from the idle stop Next, a description will be given of running by the motor generator 11.

At a time of reverse moving (No. 3), the first clutch 1301 is turned off, the second clutch 1302 is turned on, and the third clutch 1303 is turned on, so as to rotate the motor generator 11 in a negative direction (herein, a forward direction of the vehicle is of a positive direction and a backward direction is of a negative direction) to run. It has been generally known that a great drive torque is required at a time of reverse, it is desirable to set the speed change ratio of the gear change apparatus 1300 to a high position. Further, at a time of backward moving, the vehicle may be backwards moved by engaging with a reverse gear (not shown) provided in the gear change apparatus 1300 and transmitting the torque of the engine 1 to a tire 21 while slipping the first clutch 1301 as conventionally known.

At a time of forward run (No. 4), the same clutch control as that of the backward run (No. 3) is performed so as to normally rotate the motor generator 11 to run. Further, in the drive modes Nos. 4 and 5 mentioned above, since the motor generator 11 is directly connected to the transmission output shaft 19, the energy can be regenerated during reducing the speed.

Next, a description will be given of running by the engine 1.

In the case of running only by the engine 1 (No. 6), the first clutch 1301 is turned on, the second clutch 1302 is turned off and the third clutch 1303 is turned on, whereby the torque of the engine 1 is transmitted to the wheel axle 23 via the gear change apparatus 1300. At this time, since there is no energy loss due to a motor operation, it is possible to reduce the specific fuel ratio during running only by the engine. Further, by turning on the second clutch 1302 from this state, the torque of the motor-generator 11 in addition to the torque of the engine 1 is transmitted to the wheel axle 23 via the gear change apparatus 1300, so that a motor assist run can be performed (No. 7), and it is possible to improve a driving performance. Further, since the motor generator 11 is directly connected to the transmission output shaft 19, an energy can be regenerated during reducing the speed.

The driving performance can be improved by one motor by realizing the drive modes Nos. 1 to 7 mentioned above, and it is possible to reduce the specific fuel ratio.

The invention is not limited to the system structure according to each of the embodiments mentioned above, and for example, the engine may be a gasoline engine or a diesel engine. Further, the mechanism for transmitting the torque between the transmission input shaft and the electric rotary machine mentioned above can employ a mechanism capable of transmission torque such as a CVT, a chain, a belt or the like, in addition to the gear train. The clutch mechanism for engaging and disengaging between the transmission input shaft and the electric rotary machine can employ an apparatus capable of selectively transmitting and intercepting the torque, for example, a wet type multi-plate clutch, an electromagnetic clutch or the like. Further, the gear change mechanism in the invention may be structured such that four stages or more for a forward movement can be set, and a gear change mechanism setting a stage for a backward movement may be provided.

As will be apparent from the above, according to the invention, the following technical advantages can be obtained:

(1) According to the clutch for adjusting the transmission torque between the input shaft and the output shaft in the gear change apparatus, it is possible to reduce the gear change shock generated during the gear change operation without adding the electric rotary machine to the drive wheel side from the gear change apparatus.

(2) According to the feature that the rotation of the output shaft in the electric rotary machine is reduced so as to be transmitted to the engine side input shaft in a reduced manner, an electric efficiency when restarting the engine is improved.

(3) According to the feature of engaging the gears provided in the output shaft of the engine and the output shaft of the electric rotary machine with each other without interposing the other gears therebetween, it is possible to restrict an efficiency reduction at a time of engine power generation.

(4) According to the clutch for disengaging the output shaft of the electric rotary machine from the electric rotary machine side input shaft of the gear change apparatus, it is possible to disengage the engine from the electric rotary machine as occasion demands and prevent the inertia torque of the electric rotary machine from applying to the engine side as a load.

What is claimed is:

1. A power transmission apparatus of motor vehicles comprising:

an engine;

a gear change apparatus having a dog clutch and provided between said engine and a vehicle drive shaft;

an electric rotary machine connected to an output shaft of said engine and said vehicle drive shaft by way of said gear change apparatus; and a multi-plate clutch provided between an input shaft and an output shaft of said gear change apparatus and changing a transmission torque between said input shaft and said output shaft.

2. A power transmission apparatus of motor vehicles comprising:

an engine;

a gear change apparatus provided between said engine and a vehicle drive shaft;

an electric rotary machine connected to an output shaft of said engine and said vehicle drive shaft via said gear change apparatus; and a multi-plate clutch provided between an input shaft and an output shaft of said gear change apparatus and adjusting a transmission torque between said input shaft and said output shaft, wherein said clutch is mounted on a gear having a minimum gear change ratio in said gear change apparatus.

3. A power transmission apparatus of motor vehicles comprising:

an engine;

a gear change apparatus provided between said engine and a vehicle drive shaft;

a multi-plate clutch provided between an input shaft and an output shaft of said gear change apparatus and adjusting a transmission torque between said input shaft and said output shaft; and an electric rotary machine connected to an output shaft of said engine and said vehicle drive shaft by way of said gear change apparatus, wherein a rotation of an output shaft of said electric rotary machine is reduced and transmitted to an engine side input shaft of said gear change apparatus.

4. A power transmission apparatus of motor vehicles comprising:

an engine;

a gear change apparatus having a dog clutch and arranged between said engine and a vehicle drive shaft;

a multi-plate clutch provided between an input shaft and an output shaft of said gear change apparatus and changing a transmission torque between said input shaft and said output shaft; and an electric rotary machine connected to an output shaft of said engine and said vehicle drive shaft by way of said gear change apparatus, wherein the output shafts of said engine and said electric rotary machine are provided separately, and gears respectively mounted on said output shafts of said engine and said electric rotary machine for transmitting the power of said engine and said electric rotary machine, respectively, directly engage with each other.

5. A power transmission apparatus of motor vehicles according to claim 1, further having a clutch for selectively interrupting and engaging the output shaft of said electric rotary machine from the electric rotary machine side input shaft of said gear change apparatus.

6. A power transmission apparatus of motor vehicles according to claim 2, further having a clutch for selectively interrupting and engaging the output shaft of said electric rotary machine from the electric rotary machine side input shaft of said gear change apparatus.

7. A power transmission apparatus of motor vehicles according to claim 3, further having a clutch for selectively interrupting and engaging the output shaft of said electric rotary machine from the electric rotary machine side input shaft of said gear change apparatus.

8. A power transmission apparatus of motor vehicles according to claim 4, further having a clutch for selectively interrupting and engaging the output shaft of said electric rotary machine from the electric rotary machine side input shaft of said gear change apparatus.

9. A power transmission apparatus of motor vehicles comprising:

an engine;

a gear change apparatus provided between said engine and a vehicle drive shaft;

an electric rotary machine connected to an output shaft of said engine and said vehicle drive shaft by way of said gear change apparatus;

a first clutch provided on an output shaft of said engine;

a second clutch provided on an output shaft of said electric rotary machine; and a third clutch provided on said vehicle drive shaft.

10. A power transmission apparatus of motor vehicles comprising:

an engine;

a gear change apparatus provided between said engine and a vehicle drive shaft;

an electric rotary machine connected to an output shaft of said engine and said vehicle drive shaft by way of said gear change apparatus;

a first clutch provided on an output shaft of said engine;

a second clutch provided in an output shaft of said electric rotary machine; and a third clutch provided between an input shaft and an output shaft of said gear change apparatus and changing a transmission torque between said input shaft and said output shaft.

11. A power transmission apparatus of motor vehicles according to claim 1, wherein said clutch is provided on a gear having a speed change ratio equal to or more than 1.

12. A power transmission apparatus of motor vehicles according to claim 1, wherein said clutch is provided on a third speed gear of said gear change apparatus.

* * * * *